United States Patent [19]

Terunuma

[11] Patent Number: 5,537,177
[45] Date of Patent: Jul. 16, 1996

[54] CAMERA

[75] Inventor: Hiroshi Terunuma, Yachiyo, Japan

[73] Assignee: Nikon Corporation, Tokyo, Japan

[21] Appl. No.: 183,823

[22] Filed: Jan. 21, 1994

[30]    Foreign Application Priority Data

Jan. 21, 1993  [JP]  Japan ............................... 5-004388 U
Jan. 21, 1993  [JP]  Japan ............................... 5-004389 U

[51]  Int. Cl.⁶ ................................................. G03B 17/00
[52]  U.S. Cl. ...................... 354/289.12; 354/471; 354/288
[58]  Field of Search ...................................... 354/288, 485,
                354/471, 472, 473, 474, 475, 289.11, 289.12

[56]                  References Cited

U.S. PATENT DOCUMENTS

| | | | |
|---|---|---|---|
| 4,358,186 | 11/1982 | Johnson | 354/27 |
| 4,452,522 | 6/1984 | Murakami et al. | 354/289.12 |
| 4,483,601 | 11/1984 | Sekida et al. | 354/288 |
| 5,051,767 | 9/1991 | Honma | 354/406 |
| 5,086,313 | 2/1992 | Misawa | 200/5 |
| 5,158,490 | 10/1992 | Kong | 445/66 |
| 5,309,194 | 5/1994 | Itabashi | 354/471 |
| 5,323,198 | 6/1994 | Tabata | 354/173.1 |
| 5,432,578 | 7/1995 | Suzuki | 354/289.12 |

*Primary Examiner*—David M. Gray
*Assistant Examiner*—Eric Nelson
*Attorney, Agent, or Firm*—Oliff & Berridge

[57]                    ABSTRACT

The driving control CPU and the data display panel of a camera are integrated on top of a single mounting board, such as a circuit board, which is built into the interior of a camera main body. The display panel is held to the mounting board by a holding frame, which is affixed to the top of the mounting board. This display panel is situated so as to overlie the upper portion of the CPU, which is affixed to the circuit board. The electrical connections (bonding pads) for the display panel and for the shutter mechanism can be situated on opposite sides of the CPU. The connections (e.g., bonding pads) for the display panel are pressed against the connections on the mounting board to electrically connect the CPU and display panel. Similarly, the connections of the wiring connection from the shutter mechanism are pressed against the connections for the shutter mechanism formed on the mounting board to electrically connect the CPU and the shutter mechanism.

30 Claims, 7 Drawing Sheets

CAMERA

BACKGROUND OF THE INVENTION

1. Field of the Invention

The present invention is directed to cameras, and in particular to cameras including a display, such as a liquid crystal display (LCD), which displays information regarding the functions performed by the camera, and a controller, such as a CPU, for controlling the display as well as other camera components, such as, for example, a shutter mechanism, a lens system having a variably adjustable focal distance, an automatic focus (AF) mechanism, and/or an automatic exposure (AE) mechanism. In particular, the present invention is directed to the arrangement of the display and the controller in the camera to provide an efficient layout that facilitates compactness and miniaturization of the camera.

2. Description of Related Art

It is desirable in compact cameras to design for miniaturization of the camera as a whole to improve their ease of use and portability. Therefore, it is desirable to miniaturize a camera by providing internal components in a layout as efficiently as is possible. In particular, with this type of camera in order to respond to the demands of miniaturization, it is necessary to incorporate at suitable locations within the main body of the camera various structural components and structural elements, such as the tube containing the photographic lens, the shutter mechanism, the film canister compartment, the film winding spool compartment, the viewfinder device, the automatic exposure device, the automatic focus device, the flash device, the motor drive device and the LCD for displaying various types of information.

In recent years various strategies have been devised regarding the layout and positioning of various electronic parts to be incorporated into the main body of a camera in order to facilitate miniaturization and to boost the degree of camera precision. With these conventional cameras, in order to incorporate these various electronic parts within the main body of the camera in a compact manner, designers have integrated parts on circuit boards by attaching components on a number of separate circuit boards, which are placed in various locations throughout the main body of the camera. The camera can be made compact by efficiently placing these circuit boards at prescribed places within the main body of the camera.

With such cameras, it has become common to use a CPU to control the functions of the various camera parts, including the information display on the LCD, which displays various data such as the frame number on the roll of film and setting data for various photographic modes of the camera. In addition, the component driving circuits which contain the LCD and the CPU have been laid out levelly and integrated on circuit boards by using printed circuit boards situated, for example, in the upper portion of the camera body because the LCD usually is provided on the upper surface of the camera.

When a designer lays out and levelly integrates the components such as the LCD and the CPU on top of the circuit board, the designer must ensure a certain amount of additional surface area on the circuit board in order to accommodate switching structures of components also located on top of the camera. These other components include the shutter release button, the telephoto lens control for use in zooming, the button for operating the wide-angle lens, and the button for operating each type of camera mode setting with the main switch of the camera, for example. Consequently, a problem arises whereby the circuit board is enlarged and the camera body containing the circuit board also becomes large.

Hence, it is common to incorporate the large-sized circuit board by splitting the circuit board into multiple structures and arranging these structures in a number of locations throughout the camera in order to facilitate miniaturization of the camera while ensuring sufficient circuit board surface area.

Nevertheless, with the incorporation of this type of multiple circuit board technology, the interior structure of the camera becomes complex, and the components increase in number causing costs to rise. Furthermore, it is necessary to use lead wires, flexible printed circuit boards, etc. in order to link the multiple circuit boards to each other. This results in an increase in the number of components and intricate connection work. This also increases the possibility of the generation of defective products due to flawed connections arising during the manufacturing and handling of the product. This becomes a problem in terms of the ability to construct the product and in terms of cost efficiency.

Also, when the number of circuit boards increase, disadvantages also arise in inspecting components attached to each circuit board, along with the rising complexity of assembling and handling the circuit boards when affixing them within the main body of the camera.

Furthermore, as the connection distance increases between the LCD and the CPU, which require many electrical connections therebetween, a problem also arises in that electrical noise and other adverse influences appear during signal transmission.

In addition to the CPU, which is integrated upon the circuit boards, wiring connections from the shutter mechanism for the lens shutter located near the photographic lens optics also are connected to the flexible printed circuit boards. However, in this instance also, there are a large number of connection patterns and the connection process grows in complexity as the number of separate circuit boards increases.

Additionally, insofar as the flexible printed circuit board from this type of shutter mechanism is concerned, the designer must consider that within a camera having photographic lens optics with an adjustable focal distance, movements are transmitted in conjunction with the extension and retraction of the optical components. Therefore, it is necessary to fix the end of the connection part of the flexible printed circuit securely onto the circuit board.

Specifically, it is desirable in compact cameras to miniaturize the overall size insofar as possible to boost their portability and ease of use. It is desirable to arrange the main body of the camera, including the component assembly design, as efficiently and compactly as possible to achieve this miniaturization. It is desirable, therefore, to formulate some sort of strategy to be able to solve these problem points.

SUMMARY OF THE INVENTION

It is an object of the present invention to provide a camera that effectively uses the surface area of a single circuit board so as to prevent the effects of noise, etc., to facilitate camera miniaturization, to attain lower costs, to improve the ease of assembly of all circuit parts, including wiring connections, and to mount a display, for example, a LCD display panel and a CPU, in addition to any other flexible printed circuit boards, for example, from the shutter mechanism.

In order to achieve the foregoing and other objects, and to overcome the shortcomings discussed above, the display panel that displays data regarding the various camera functions is mounted over the CPU that controls the display panel and controls other components of the camera, on a single mounting board (such as a circuit board). Preferably, the CPU is fixed to a surface of the mounting board, and the display panel is fixed to the mounting board over the CPU by a holding frame that maintains a small space between the CPU and the display panel.

This structure results in sufficient free space remaining on the surface of the mounting board to enable numerous other circuitry to be formed on the mounting board. For example, circuit patterns for a zoom switch (used to regulate the focus distance), a release switch (used to release the shutter to shoot a photograph), operation buttons (used to change modes of operation of the camera) and a main switch (used to turn the camera on or off) can be provided on the mounting board without requiring its size to be made overly large.

Additionally, bonding contacts can be provided on the mounting board on opposite sides of the stacked CPU/panel display for attachment of the CPU to the panel display and to a flexible printed circuit board that leads to the shutter mechanism.

Through this design, one obtains the shortest possible connection distance between the LCD display panel and the shutter mechanism by connecting the wire connections from the display panel and the shutter mechanism to connections on either side of the CPU, which is integrated onto the surface of the mounting board. In addition to permitting direct signal outputs from the CPU to the LCD and to the shutter mechanism, this design makes it possible to consolidate components on a single circuit board by holding down the integration area needed for those parts as much as possible, while making space available for other circuit components.

Moreover, through this design, the display panel, which requires a certain amount of space, is situated on top of the driving-control CPU, which occupies a large area with its driving control circuitry. This arrangement situates both the display panel and the CPU above the circuit board at a specified location by using a double-layer structure, stacking the display panel above the CPU. Accordingly, this design makes possible the efficient use of circuit board area on the upper surface of the circuit board by placing and integrating components in a highly efficient layout for each type of circuit part necessary to the camera.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

FIGS. 1 through 7 show an example of a first camera that incorporates the invention. The descriptions below will plainly explain, first, an abbreviated structure of a suitable camera that makes use of the invention referring to FIGS. 4–7.

Camera 1 includes a camera main body 2 and a lens tube 3 located on a central portion of the front of the camera, which holds a zoom photographic lens 3a. The camera 1 is known as a zoom compact camera.

Figure 6:
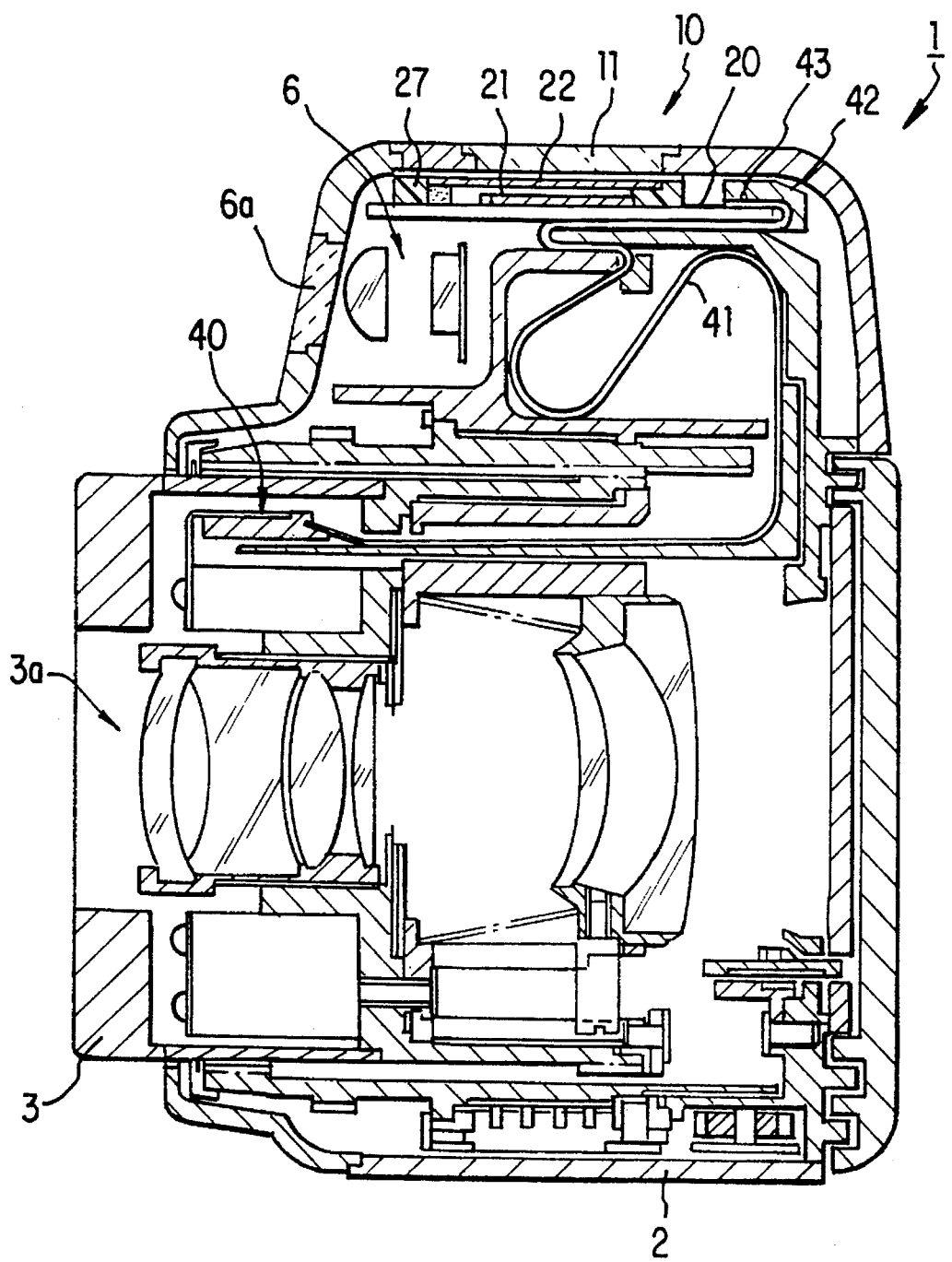
FIG. 6 is a cross-sectional side view of the FIG. 1 camera and shows the photographic lens optics in the wide-angle mode.
Figure 7:
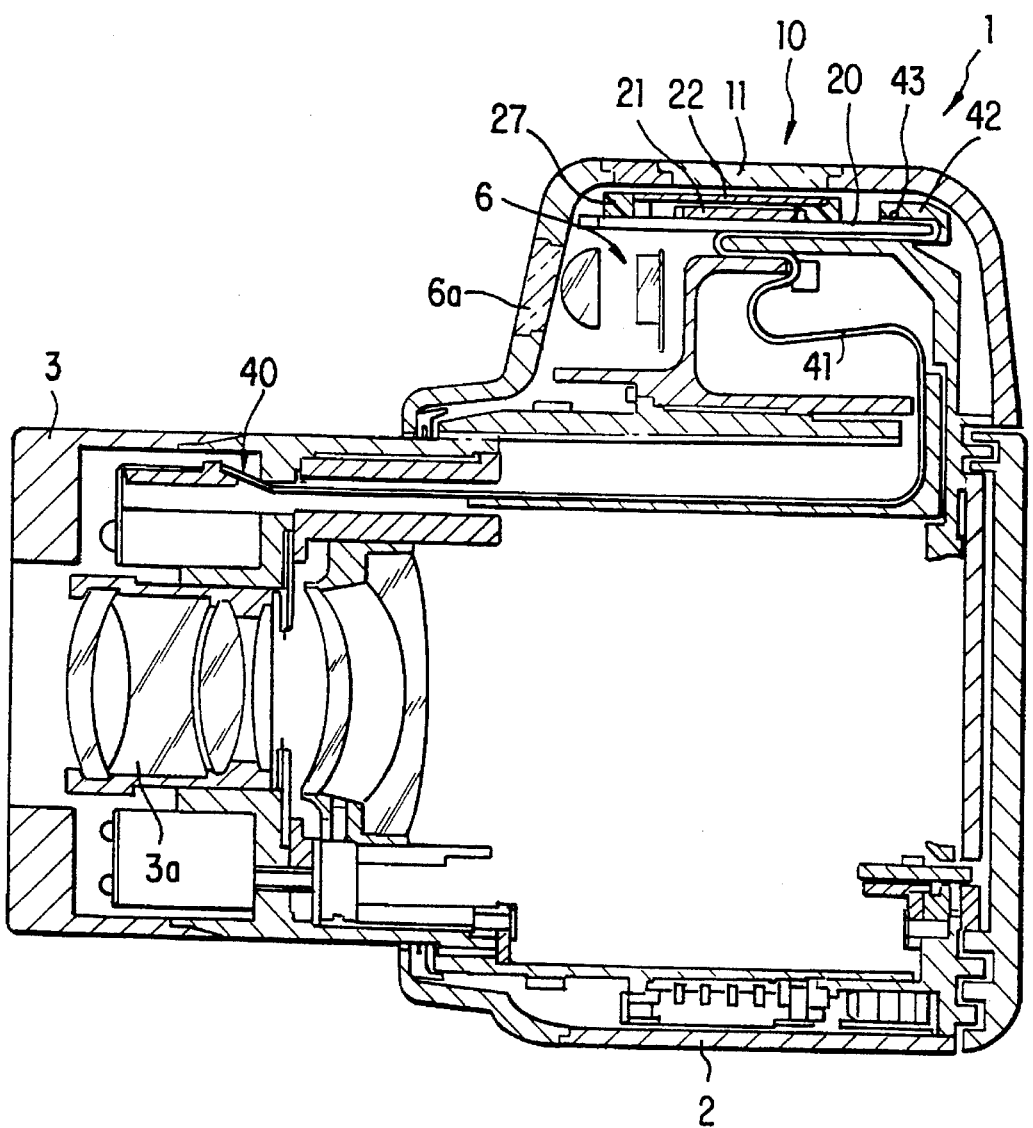
FIG. 7 is cross-sectional side view similar to FIG. 6 and shows the photographic lens optics in the telephoto mode.

Moreover, as clearly can be seen in FIGS. 6 and 7, the zoom photographic lens moves in the direction of the light axis through the rotation of the lens tube 3 and makes possible an adjustable focal distance. In this instance, as clearly can be seen in, for example, FIG. 6, within the camera main body 2, each type of necessary component for the camera is placed at appropriate positions. These details are well known in the industry and, therefore, a concrete explanation therefore has been omitted.

Figure 4:
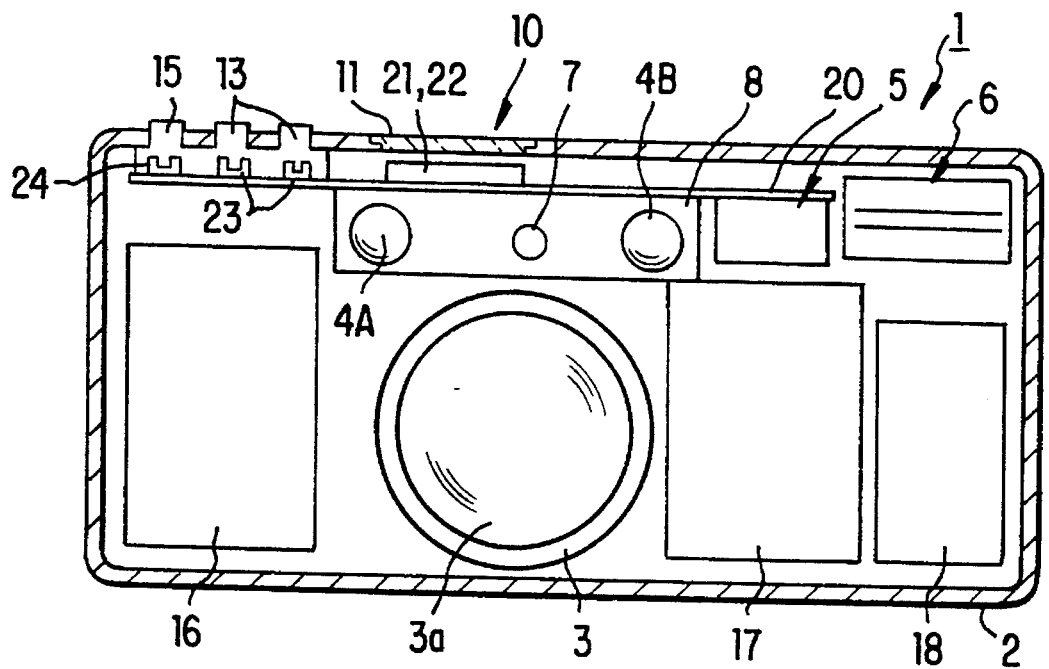
FIG. 4 is a cross-sectional front view of the FIG. 1 camera and shows some of the structure of the entire camera incorporating the invention.

Referring to FIG. 4, automatic focus (AF) lenses 4A and 4B, used in emitting and receiving light within the distance-measuring element of the AF device, and corresponding to the distance-measuring openings 4a and 4b (in FIG. 5) are constructed at a position above the lens tube 3 on the front portion of the camera main body 2. A viewfinder device 5 corresponding to the viewfinder opening 5a (in FIG. 5) also is provided on the front portion of the camera main body. A flash emitting component 6 of an electronic flash device corresponding to the flash opening 6a (in FIG. 5) also is provided on the camera body front portion. Camera body 2 also includes the automatic exposure (AE) lens 7 comprised of a photometer corresponding to the photometer opening 7a (in FIG. 5) for use with the AE device. These devices and their openings are juxtaposed on the upper portion of the front of the camera main body 2.

Referring to FIG. 4, a device block unit 8 contains the distance measuring device (including the AF lens 4A and 4B) for use in the AF device.

Figure 5:
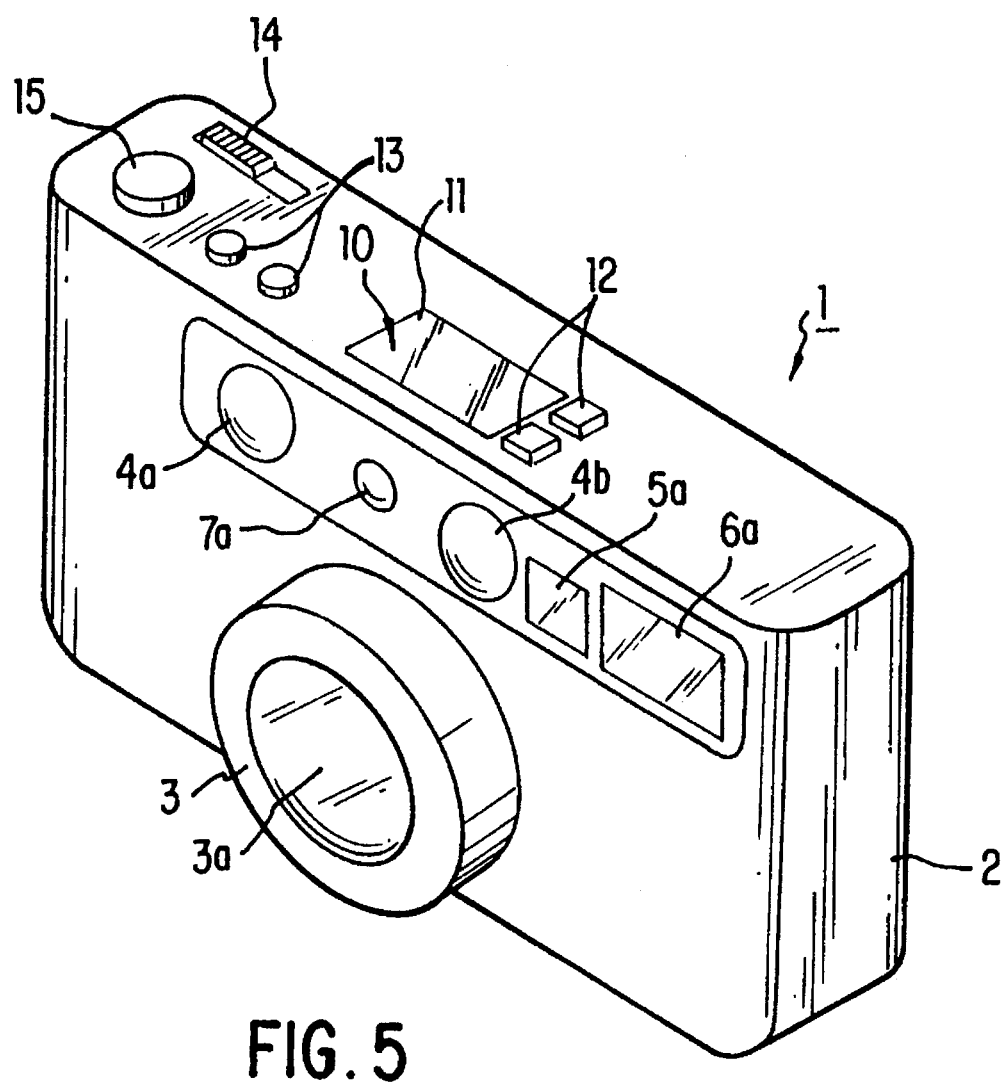
FIG. 5 is a perspective view of the FIG. 1 camera.

In FIG. 5, the operation panel 10 is set in the central portion of the top of the camera body 2. This operation panel 10 is comprised of an LCD display opening 11 that displays each type of camera operation and function, including photographic data. Operation panel 10 also is comprised of the operation buttons portion comprised of multiple operation buttons 12 (two buttons in this example) aligned in a row on the top of camera body 2 next to the LCD display opening 11 (on the left side of the main body in this example). These operation buttons 12 set various necessary modes for operating the camera and are pushed by the operator as needed to control functional procedures. Camera 1 also includes a zoom switch button 13 for use in adjusting the focal distance point of the photographic lens parts 3a. One setting is the telephoto lens side and the other setting is the wide-angle lens side. Button 14 operates the main switch for camera 1. This button is for operating the on-off switch controlling the drive control components of the entire camera. Shutter release button 15 is the shutter release switch.

The structural components of camera 1 not described above are well known in the art. For example, camera 1 also includes compartments 16 and 17 for the film canister and the film winding spool, and condenser 18. Detailed explanations of other parts have been omitted herein.

As clearly seen in FIGS. 1, 4, 6 and 7, within the interior of the camera main body 2 in camera 1 structured as described above, a single mounting board 20 manufactured, for example, as a printed circuit board is installed in an almost horizontal position along the face of the top interior wall of the camera main body 2.

On the bottom of mounting board 20 is the device block unit 8, which contains the photometer used in the AE device and the distance measuring portion of the AF device. On top of mounting board 20 is both the CPU 21 used in controlling the driving of each part of camera 1, and the LCD 22, which is used as the display panel for displaying each type of function data. Furthermore, as clearly can be seen in FIGS. 2 and 4, on top of mounting board 20 is built zoom switch 13, which is used for adjusting the focal length, pattern 23, which is used with switch 13, pattern 24 (24a, 24b), which is used with the shutter release switch 15, and slide-type pattern 25, which is used with the camera main switch 14. Also on the upper surface of mounting board 20 in the area of the LCD 22 is built the operation buttons 12, which are used in of the top interior wall of the camera main body 2.

On the bottom of mounting board 20 is the device block unit 8, which contains the photometer used in the AE device and the distance measuring portion of the AF device. On top of mounting board 20 is both the CPU 21 used in controlling the driving of each part of camera 1, and the LCD 22, which is used as the display panel for displaying each type of function data. Furthermore, as clearly can be seen in FIGS. 2 and 4, on top of mounting board 20 is built zoom switch 13, which is used for adjusting the focal length, pattern 23, which is used with switch 13, pattern 24 (24a, 24b), which is used with the shutter release switch 15, and slide-type pattern 25, which is used with the camera main switch 14. Also on the upper surface of mounting board 20 in the area of the LCD 22 is built the operation buttons 12, which are used in setting the camera modes, and switch pattern 26, which is used with buttons 12.

Each of these switch patterns 23, 24, 25 and 26 are formed on the upper surface of the same mounting board (e.g., circuit board) 20 to which the CPU 21 and LCD 22 are integrated.

Figure 3:
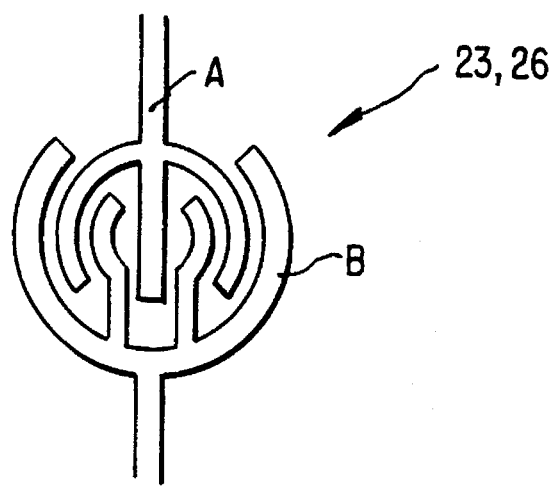
FIG. 3 is a detailed diagram of the switch pattern formed on top of the circuit board of FIG. 2.

Moreover, as can be seen, for example, in FIG. 3, the patterns 26 and 23 with each switch 12, 13, etc. described above are built to have the structure of pattern A entering into pattern B in order that the electrically-conductive portions of each switch button can perform a switching action through short circuiting patterns A and B (when the corresponding button is pressed).

Further, circuit board components not described above (also not illustrated in the Figures) may be integrated onto the circuit board 20; however, the details of these structures have been omitted.

Within the structure described above, the LCD 22 is integrated onto the upper surface of the mounting board 20 through the means of a double-layer structure, with the drive-controlling CPU 21 located on the underside of LCD 22. In addition, the LCD 22 is integrated onto the upper surface of mounting board 20 as is clear in FIG. 1 through the means of an LCD holder 27, which acts as a holding frame so that the LCD 22 is secured while leaving a space between LCD 22 and the surface of the mounting board.

Also on the top surface of the mounting board 20 described above, in a position on opposite sides of CPU 21, which is affixed to the upper surface of the mounting board, are the pressure welding (or bonding) connections (i.e., bonding pads) 30 for use with the display panel (LCD 22) in a parallel pattern of multiple electrically-conductive pads. Adjacent to the opposite side of CPU 21, and on the same, upper surface of board 20 are provided pressure welding connections (i.e., bonding pads) 31 for use in attaching CPU 21 with the shutter mechanism.

Subsequently, the connections for LCD 22 are welded (bonded) to the bonding pads 30 for the display panel by means of zebra connector 29 to electrically connect the electrically-conductive portions of both components. Also, the connection part of the flexible printed circuit board 41, which comprises the wiring connections for the shutter mechanism 40 that is installed near photographic lens 3a, is pressure welded (bonded) to the bonding pads 31 for the shutter mechanism to electrically connect the electrically-conductive portions of both components.

Figure 1:
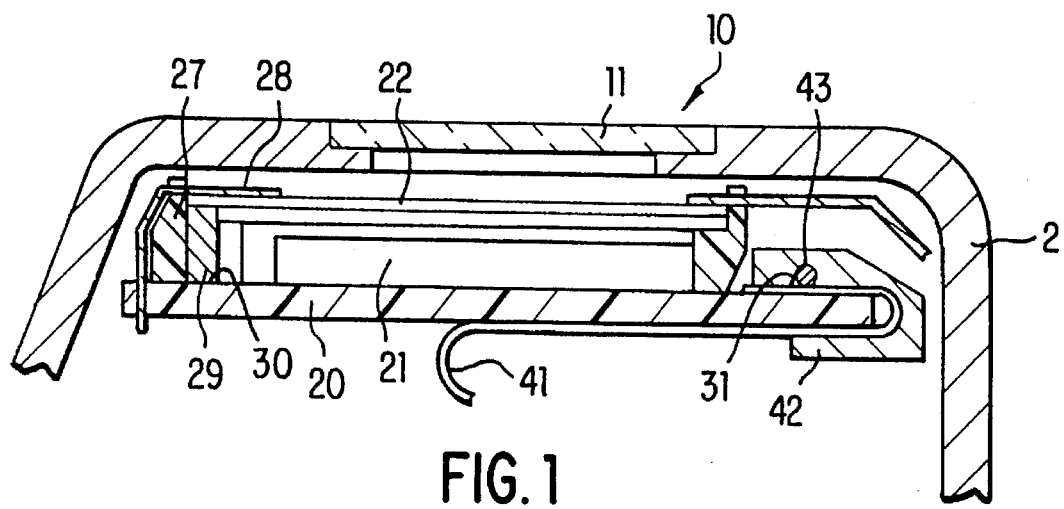
FIG. 1 is an enlarged cross-sectional view from one side showing part of a first camera incorporating an embodiment of the invention.
Figure 2:
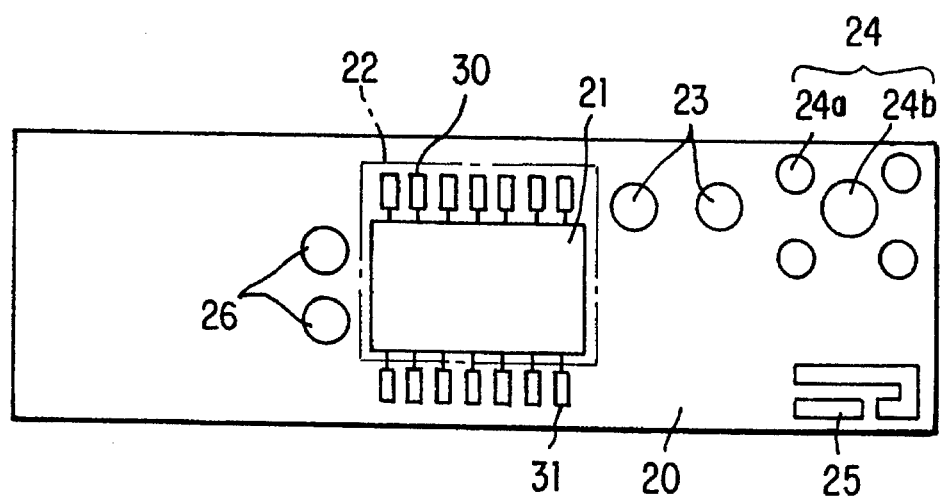
FIG. 2 is a top plan view of part of the circuit board used within the FIG. 1 camera.

As is clear from FIG. 1, the double-layered portion comprised of CPU 21 and LCD 22 on top of board 20 is fixed into position by the LCD holder 27, which is fixed on top of board 20 and presents the shape of a frame. The double-layered portion is constructed so that the LCD 22 floats a certain distance above the CPU 21, which is affixed to the surface of the circuit board. LCD 22 and the LCD holder 27 are attached on top of board 20 through the action of the restrainer 28 in such a way as to connect the bonding pads 30 on top of board 20 to the connection points on the side of LCD 22 by means of zebra connector 29.

Also, as is clear from FIG. 1, within the part of the device having the bonding pads 31 for the shutter mechanism, which is formed on one side of CPU 21 integrated onto board 20, the connection for the flexible printed circuit board 41 (for the shutter mechanism near to the photographic lens optical component 3a) comes from the interior of the camera main body 2 and is fixed onto the edge of board 20 by the pressure connecting structure 42, which is in the form of a clip. Elastic material 43 is pressed onto and attached to the connections for the flexible printed circuit board 41 through the action of the clip 42. Electrically connecting the electrically-conductive portions of the flexible printed circuit board 41 becomes possible through pressure welding the parts onto the face of the circuit board in relation to the electrically-conductive portion of the bonding pad 31 of board 20. Additionally, one can use the LCD holder 27 to perform the function of this type of pressure connecting structure and omit the clip 42.

Specifically, through this design, one obtains the smallest possible connection distances by connecting the flexible printed circuit board 41 from the shutter mechanism 40 and the LCD 22 onto the bonding pads on either side of the CPU 21, which is integrated onto the surface of the board 20. In addition to permitting direct signal outputs from the CPU 21 to the LCD 22 and to the shutter mechanism 40, this design makes possible a consolidation of components on a single circuit board by holding down the integration area needed for those parts as much as possible, while making space available for other circuit components.

As is clear from FIGS. 6 and 7, in a variable-focus camera 1 structured with an adjustable focal distance for the photographic lens part 3a, these types of advantages have large effects with the shutter mechanism 40 being situated near the photographic lens parts 3a and connections to the CPU 21 being made by means such as the flexible printed circuit board 41. FIG. 6 shows the lens tube 3 retracted in the wide-angle mode and FIG. 7 shows the lens tube 3 extended in the telephoto mode. Clip 42 securely holds flexible printed circuit board 41 on to the mounting board 20, preventing detachment thereof during movement of the lens.

Also, with a structure like that described above, the LCD 22, comprised of a display panel that necessarily occupies a certain area, is situated on top of the CPU 21, comprised of a driving control unit that takes up a large area due to its driving control circuits. This design situates both the LCD 22 and CPU 21 above the board 20 at a specific location by using a double-layer structure, stacking the LCD 22 above the CPU 21. This design makes possible the efficient use of area on the upper surface of board 20, which preferably is a circuit board, by holding down the integration area needed for these two components as much as possible.

Through this type of structure, one can integrate or arrange components such as every type of necessary circuit part for camera 1, including switches 12-15 described above, by consolidation with high integration efficiency through the necessary layout. Therefore, defects do not arise during the connection work and flaws do not arise during the handling of the product as was the case when the components were integrated on multiple circuit boards as in the past. Another advantage is the greater ease in assembling the product. One can anticipate cutting costs for the camera as a whole.

Moreover, this design is not restricted to the structure of the actual example described above. One could modify or change the shape, structure, etc. of each component including the circuit board 20.

For example, different shapes could be used for features such as the circuit board, the connection structure or the assemblage for the CPU 21, and the display panel with the LCD 22, etc.

Also, this design is not restricted to a camera having a variable focal point as in the embodiment described above. The results and advantages are achieved by application of the invention to any camera structure having an LCD 22 and CPU 21 integrated onto a single circuit board 20, and having the necessity of connecting wire connections such as the flexible printed circuit board 41 from a shutter mechanism.

In a camera built in accordance with the invention as explained above, the display panel for displaying data about various camera functions is held by a holding frame attached to the circuit board so as to overlie the CPU that controls the driving of various camera parts. Moreover, the invention positions the connections for the shutter mechanism and the connections for the display panel on opposite sides of the CPU, which is affixed to the upper surface of the circuit board. The invention electrically connects the display panel connections to its corresponding connections on the mounting board by means of pressure. The design also electrically connects the shutter mechanism connections to the corresponding connections on the mounting board by pressure. Regardless of the simplicity of the structure, the invention demonstrates superior pragmatic effects as listed below.

Through this invention, one connects the connections from the display panel and from the shutter mechanism with the shortest possible connection distance to the CPU, which is integrated onto the surface of the mounting board. This invention permits direct signal outputs from the CPU to the LCD and to the shutter mechanism, and allows the designer to affix and integrate components efficiently onto the circuit board. This in turn makes possible cost cutting and a miniaturization of the camera. Furthermore, in addition to being able to prevent the effects of noise, etc., by holding down the integration area taken up by these components as much as possible, the invention makes space available for other circuits, etc., and makes possible the integration of other components. This in turn makes possible the consolidation of components to a single circuit board.

These advantages have especially large effects in a variable-focus camera, which is structured with an adjustable focal distance of the photographic lens, in which the shutter mechanism is situated near the photographic lens parts and connections to the CPU are made by means such as a flexible printed circuit board.

Also, in this invention, the display panel, which necessarily occupies a certain area, is situated together with the driving-control CPU, which occupies a large area with its driving control circuits, by stacking these components above the circuit board at a specified location through the use of a double-layer structure. This invention makes possible the efficient use of circuit board area on the upper surface of the circuit board and makes possible high integration efficiency for juxtaposing components and integration through the layout needed for each type of circuit component necessary for the camera.

Also, through this invention, one can integrate or arrange components such as every type of necessary circuit part for driving control of the camera on a single circuit board. Therefore, defects do not arise during the connection process, and flaws do not arise during the handling of the product as was the case when components were integrated on multiple circuit boards as in the past. Another advantage is the greater ease in assembling the product. Additionally, one can anticipate cutting costs for the camera as a whole.

A second camera that incorporates the invention will be described with reference to FIGS. 8-11. The same reference numbers are used in FIGS. 8-11 to describe features that are similar to those contained in the first camera. The second camera has a different button layout than the first camera.

Figure 8:
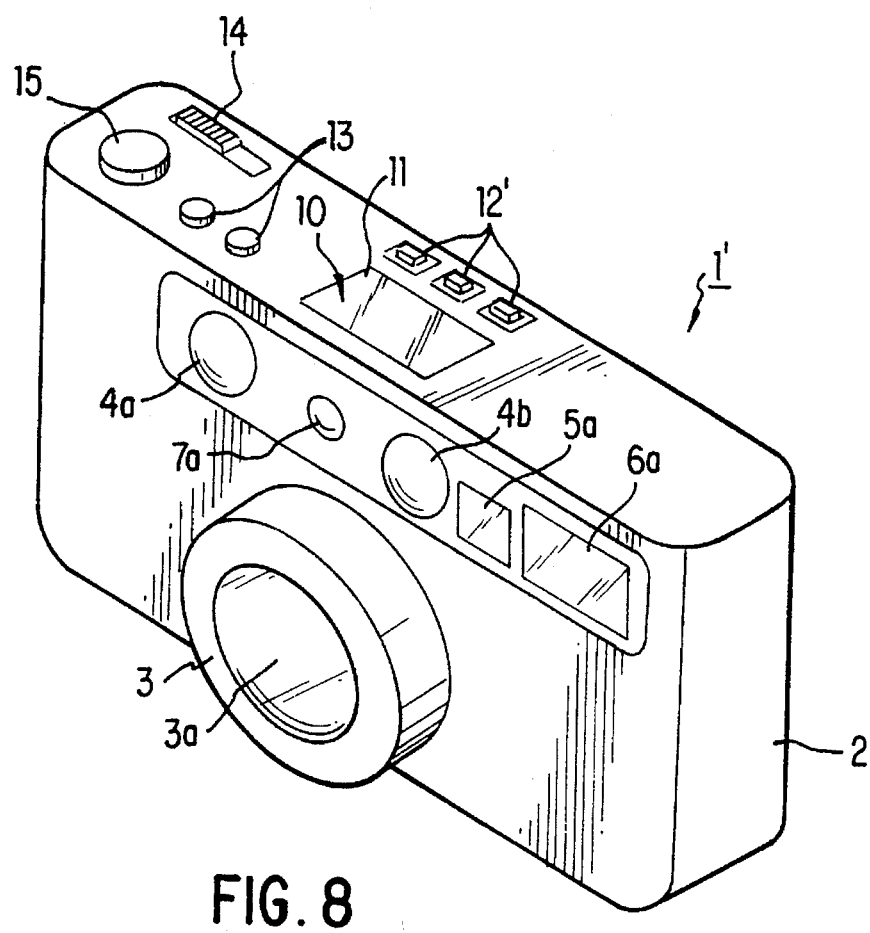
FIG. 8 is a perspective view of a second camera incorporating the invention.
Figure 10:
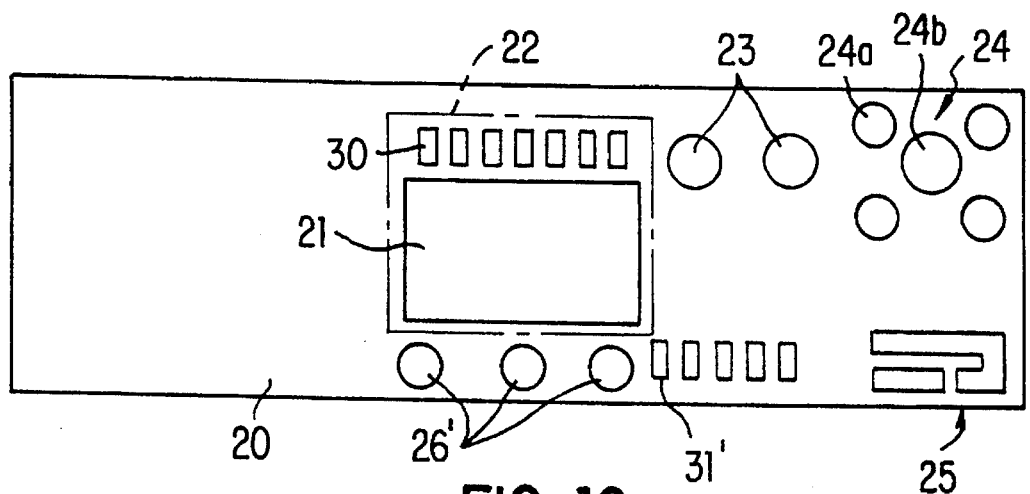
FIG. 10 is a top plan view of the mounting board used in the FIG. 8 camera.

FIG. 8 is a perspective view of a second camera 1' incorporating the invention. The second camera 1' includes three operation buttons 12' located on a side of the operation panel 10 that is adjacent to the back of camera 1'. As shown in FIG. 10, LCD 22 overlies CPU 21, both being mounted on circuit board 20. The switch patterns 23, 24 (24a and 24b) and 25 are located on this same, upper surface of board 20 as with the first camera. In addition, the switch pattern 26' for the mode setting operation buttons 12, the connection pattern 30 for the LCD 22, and the connection pattern 31' for a shutter mechanism are all arranged on the upper surface of the mounting board 20, as is clear in FIG. 10.

Figure 11:
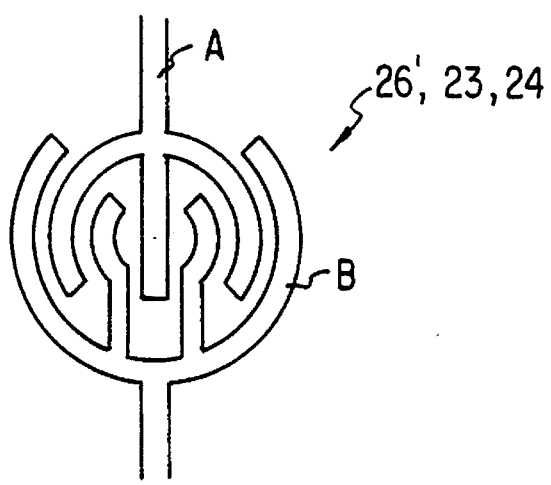
FIG. 11 is a detailed drawing of the switch patterns formed on the mounting board in FIG. 8.

The patterns 26', 23, 24 for the various switches 12, 13, 15, described above, are composed of a pattern A intertwined with a pattern B, as shown in FIG. 11. As detailed earlier, the switch operation is executed when an electrically conductive part on the various switch buttons creates a short circuit between patterns A and B.

Figure 9:
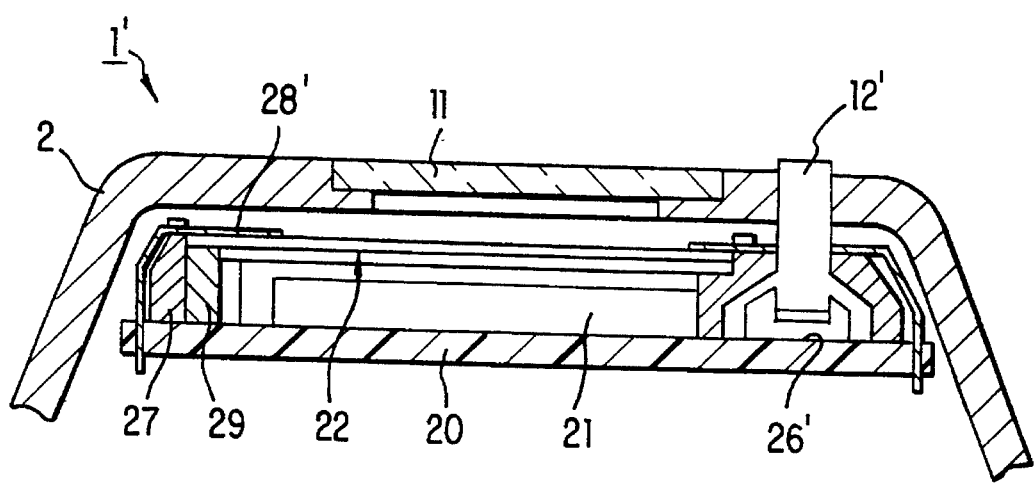
FIG. 9 is an enlarged cross-sectional side view showing parts of the FIG. 8 camera.

The two-level structure on the mounting board 20, composed of the CPU 21 and the LCD 22 as described above, is kept in place by an LCD holder 27 in the form of a frame mounted on top of the board 20, as is clear in FIG. 9, so that LCD 22 is positioned a fixed distance above the surface of board 20. Also, this LCD 22 and LCD holder 27 are fixed to the board 20 by means of a brace 28', and the CPU 21 is mounted on the surface of the board 20 inside the holder 27. As shown in FIG. 9, a zebra connector 29 connects the connection pattern 30 on the surface of board 20 with a point of contact on LCD 22.

With this invention using the structure described above, the LCD 22 display panel, which requires a certain amount of area, and the CPU 21 used for drive control, which has a large area requirement among the parts that comprise the drive control circuits, are installed in a two-level structure with one above the other in a predetermined location on the surface of the mounting board 20, so that the area on which items can be mounted on the mounting board 20 is used efficiently and so that the various switches 12, 13, 14, 15, which are circuit parts necessary in the camera 1', can be installed or mounted with a high mounting efficiency following the required layout.

In particular, with the structure described above, because the various circuit parts necessary for drive control in the camera are mounted on a single mounting board 20, problems such as accidents during the mounting of several boards or during handling do not occur as is possible with conventional designs. Accordingly, the assembly process is improved and the cost of the camera 1' as a whole can be reduced.

This invention is not limited to the structure of the cameras described above. The form and arrangement of the various parts, including the mounting board 20, which can be composed of printed circuit boards on which are mounted the LCD 22 display panel and CPU 21, and on which are formed the various switch patterns 23, 24, 25, 26', can be altered or changed as necessary.

For instance, various changes can be made such as altering the connection structure, and the combination of the drive control parts including the CPU 21 with the display panel including the LCD 22 on the circuit board 20.

As explained above, the camera corresponding to this invention is made with a display panel mounted on a single mounting board by means of a support plate that supports it and keeps it a fixed distance from the surface of the mounting board, with a CPU used to control the various parts of the camera mounted on the underside of the display panel on the mounting board so that the display panel and the CPU are installed in a two-level structure on the mounting board. This allows a pattern for a zoom switch that regulates the focus distance, a pattern for the release switch and a pattern for the main switch of the camera to be arranged on the same surface on the remaining portion of the mounting board. Because of this, the invention offers various advantages, including the advantage that the display panel, which requires a certain amount of area, and the CPU used for drive control, which has a relatively large area requirement among the parts that comprise the drive control circuits, are installed in a two-level structure with one above the other in a pre-determined location on the surface of the mounting board, so that the area on which items can be mounted on the mounting board is used efficiently and so that the various circuit parts necessary in the camera can be installed or mounted with a high mounting efficiency following the required layout.

Furthermore, because the various circuit parts necessary for drive control of the camera can be installed or mounted on a single mounting board, this invention offers the advantage that problems such as accidents during the mounting of several boards or during handling do not occur as they do with conventional models. Additionally, the assembly process is improved and the cost of the camera as a whole can be reduced.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A camera comprising:
   a mounting board having first and second oppositely facing surfaces;
   a controller mounted on said first surface of said mounting board; and
   a display panel mounted to said first surface of said mounting board and at least partially overlying said controller.

2. The camera of claim 1, wherein said mounting board is a circuit board having circuit patterns formed at least on said first surface.

3. The camera of claim 2, wherein said circuit patterns include at least one of a shutter-release switch circuit pattern, an on-off switch circuit pattern, a zoom switch circuit pattern, and a mode-selection switch circuit pattern.

4. The camera of claim 2, wherein said circuit patterns include a shutter-release switch circuit pattern, an on-off switch circuit pattern, a zoom switch circuit pattern, and a mode-selection switch circuit pattern.

5. The camera of claim 2, wherein said circuit patterns include:
   a plurality of first display panel bonding pads located on a first side of said controller, said display panel having a plurality of second display panel bonding pads electrically connected to said plurality of first display panel bonding pads; and
   a plurality of first shutter mechanism bonding pads located on a second side of said controller opposite from said first side.

6. The camera of claim 5, further comprising:
   a first pressure connector which presses said plurality of first display panel bonding pads toward said plurality of second display panel bonding pads;
   a flexible printed circuit board having a first end attached to a shutter mechanism of said camera, and a second end having a plurality of second shutter mechanism bonding pads that are electrically connected to said plurality of first shutter mechanism bonding pads on said circuit board; and
   a second pressure connector which presses said plurality of first shutter mechanism bonding pads toward said plurality of second shutter mechanism bonding pads.

7. The camera of claim 6, wherein said second pressure connector is a clip.

8. The camera of claim 5, further comprising a zebra connector between said plurality of first display panel bonding pads and said plurality of second display panel bonding pads.

9. The camera of claim 2, wherein said circuit patterns include a plurality of first display panel bonding pads located on a first side of said controller, said display panel having a plurality of second display panel bonding pads electrically connected to said plurality of first display panel bonding pads, and a pressure connector which presses said plurality of first display panel bonding pads toward said plurality of second display panel bonding pads.

10. The camera of claim 9, further comprising a zebra connector between said plurality of first display panel bonding pads and said plurality of second display panel bonding pads.

11. The camera of claim 9, wherein said pressure connector is a frame which attaches said display panel to said circuit board while pressing said plurality of first display panel bonding pads toward said plurality of second display panel bonding pads.

12. The camera of claim 1, further comprising a display panel holding frame attached to said display panel and to said mounting board so as to mount said display panel to said mounting board over said controller.

13. The camera of claim 12, wherein said display panel holding frame mounts said display panel a predetermined distance over said first surface of said mounting board so that a space exists between said display panel and said controller.

14. The camera of claim 1, further comprising a device block unit containing an autofocus device and an autoexposure device, said device block unit mounted to said second surface of said mounting board.

15. The camera of claim 1, wherein said controller includes a central processing unit.

16. The camera of claim 1, wherein said display device includes a liquid crystal display.

17. A camera comprising:

a mounting board having first and second oppositely facing surfaces;

display means for displaying information regarding operation of the camera, said display means mounted over and spaced above said first surface of said mounting to said mounting board board; and control means for controlling said display means and said camera, said control means mounted on said first surface of said mounting board below said display means.

18. The camera of claim 17, wherein said mounting board is a circuit board having circuit patterns formed at least on said first surface.

19. The camera of claim 18, wherein said circuit patterns include at least one of a shutter-release switch circuit pattern, an on-off switch circuit pattern, a zoom switch circuit pattern, and a mode-selection switch circuit pattern.

20. The camera of claim 18, wherein said circuit patterns include a shutter-release switch circuit pattern, an on-off switch circuit pattern, a zoom switch circuit pattern, and a mode-selection switch circuit pattern.

21. The camera of claim 18, wherein said circuit patterns include:

a plurality of first display bonding pads located on a first side of said control means, said display means having a plurality of second display bonding pads electrically connected to said plurality of first display bonding pads; and a plurality of first shutter mechanism bonding pads located on a second side of said control means opposite from said first side.

22. The camera of claim 21, further comprising:

a first connector means for pressing said plurality of first display bonding pads toward said plurality of second display bonding pads;

a flexible printed circuit board having a first end attached to a shutter mechanism of said camera, and a second end having a plurality of second shutter mechanism bonding pads that are electrically connected to said plurality of first shutter mechanism bonding pads on said circuit board; and a second connector means for pressing said plurality of first shutter mechanism bonding pads toward said plurality of second shutter mechanism bonding pads.

23. The camera of claim 18, wherein said circuit patterns include a plurality of first display bonding pads located on a first side of said control means, said display means having a plurality of second display bonding pads electrically connected to said plurality of first display bonding pads, and connector means for pressing said plurality of first display bonding pads toward said plurality of second display bonding pads.

24. The camera of claim 17, further comprising display holding means attached to said display means and to said mounting board for mounting said display means to said mounting board over said control means.

25. The camera of claim 24, wherein said display holding means mounts said display means a distance over said first surface of said mounting board so that a space exists between said display means and said control means.

26. A method of making a camera comprising:

mounting a display panel to a first surface of a mounting board; and mouting a controller that controls said display panel to said first surface of said mounting board so that said display panel at least partially overlies said controller.

27. The method of claim 26, wherein said mounting board is a circuit board, and further comprising forming at least one of a shutter-release switch circuit pattern, an on-off switch circuit pattern, a zoom switch circuit pattern, and a mode-selection switch circuit pattern on said first surface of said circuit board.

28. The method of claim 27, wherein said shutter-release switch circuit pattern, said on-off switch circuit pattern, said zoom switch circuit pattern, and said mode-selection switch circuit pattern all are formed on said first surface.

29. The method of claim 26, wherein said mounting board is a circuit board, and further comprising:

forming a plurality of first display panel bonding pads on said first surface adjacent to a first side of said controller;

forming a plurality of first shutter mechanism bonding pads on said first surface adjacent to a second side of said controller opposite from said first side;

electrically connecting a plurality of second display panel bonding pads located on said display panel to said plurality of first display panel bonding pads; and electrically connecting a plurality of second shutter mechanism bonding pads located on a flexible printed circuit board having a first end attached to a shutter mechanism of said camera to said plurality of first shutter mechanism bonding pads on said circuit board.

30. The method of claim 29, wherein said plurality of first display panel bonding pads are pressed toward said plurality of second display panel bonding pads and said plurality of first controller bonding pads are pressed toward said plurality of second controller bonding pads.

* * * * *